United States Patent [19]

Vananrooy et al.

[11] 3,862,674
[45] Jan. 28, 1975

[54] CALIPER DISK BRAKE HAVING EASILY REMOVABLE LININGS

[75] Inventors: John A. Vananrooy, St. Joseph; Richard M. Kramer, Stevensville, both of Mich.

[73] Assignee: Lambert Brake Corporation, St. Joseph, Mich.

[22] Filed: Apr. 9, 1973

[21] Appl. No.: 349,062

[52] U.S. Cl. .............................. 188/73.3, 188/73.6
[51] Int. Cl. ............................................. F16d 65/02
[58] Field of Search ....... 188/73.3, 73.6, 71.1, 72.4, 188/.5, 73.4

[56] References Cited
UNITED STATES PATENTS

| | | | |
|---|---|---|---|
| 2,968,370 | 1/1961 | Ruet | 188/73.3 X |
| 3,261,430 | 7/1966 | Wilson et al. | 188/73.6 |
| 3,374,866 | 3/1968 | Miles | 188/73.3 X |
| 3,469,658 | 9/1969 | Forsythe | 188/73.6 X |
| 3,522,866 | 8/1970 | Habersack | 188/73.6 |
| 3,532,192 | 10/1970 | Falk | 188/73.4 |
| 3,602,328 | 8/1971 | Fannin et al. | 188/73.6 X |

FOREIGN PATENTS OR APPLICATIONS

| 935,994 | 9/1963 | Great Britain | 188/73.6 |
|---|---|---|---|

Primary Examiner—George E. A. Halvosa
Attorney, Agent, or Firm—Olson, Trexler, Wolters, Bushnell & Fosse, Ltd.

[57] ABSTRACT

A disk brake is disclosed wherein the brake pads are mounted on opposite sides of a disk by removable pins. The pads can be quickly removed without disturbing the brake housing, disk or wheel by removing one pin and rotating the pads out of engagement with an opposite pin and other brake parts. Adjustable spacers are included which mount primary and secondary housing parts at an appropriate fixed distance apart. These spacers can be easily machined for use with any of a wide variety of pad and disk combinations.

2 Claims, 3 Drawing Figures

PATENTED JAN 28 1975 3,862,674
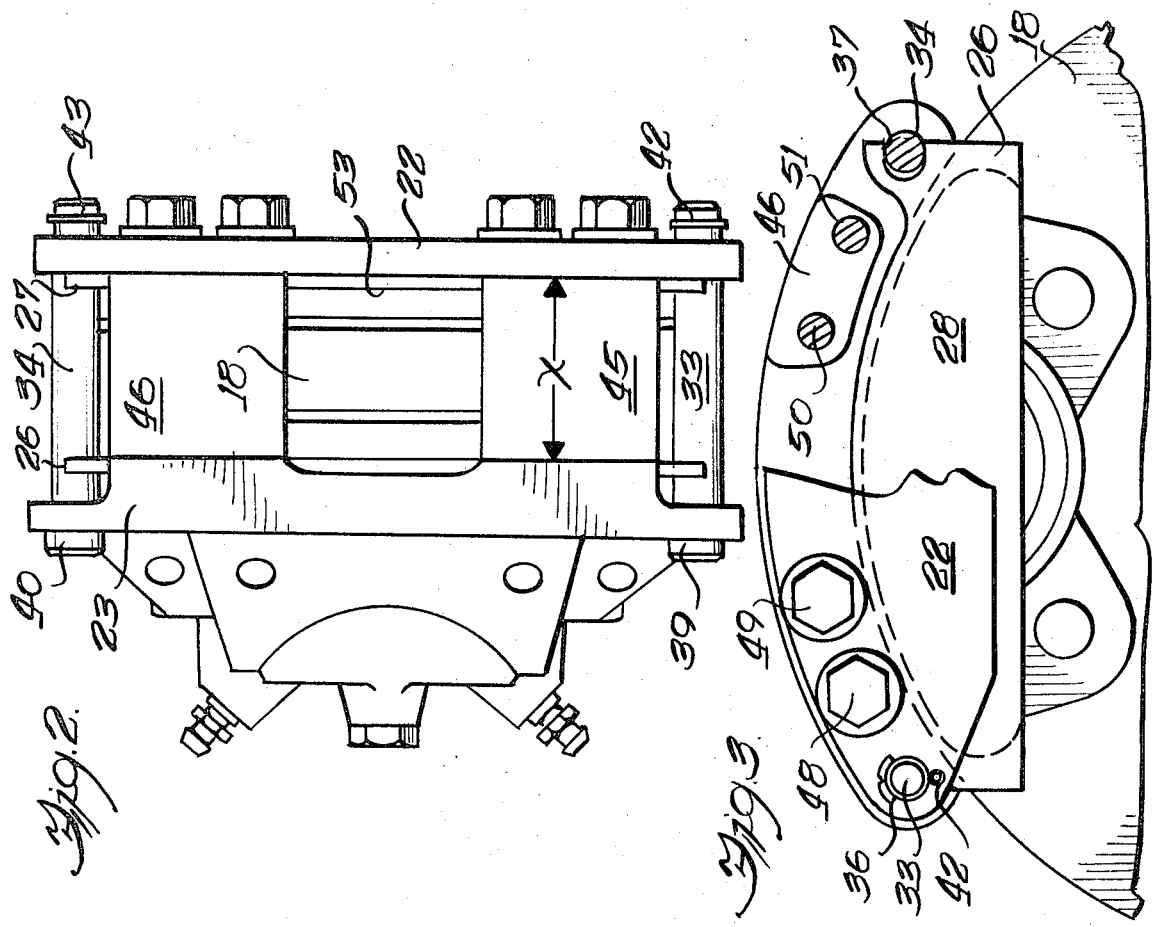
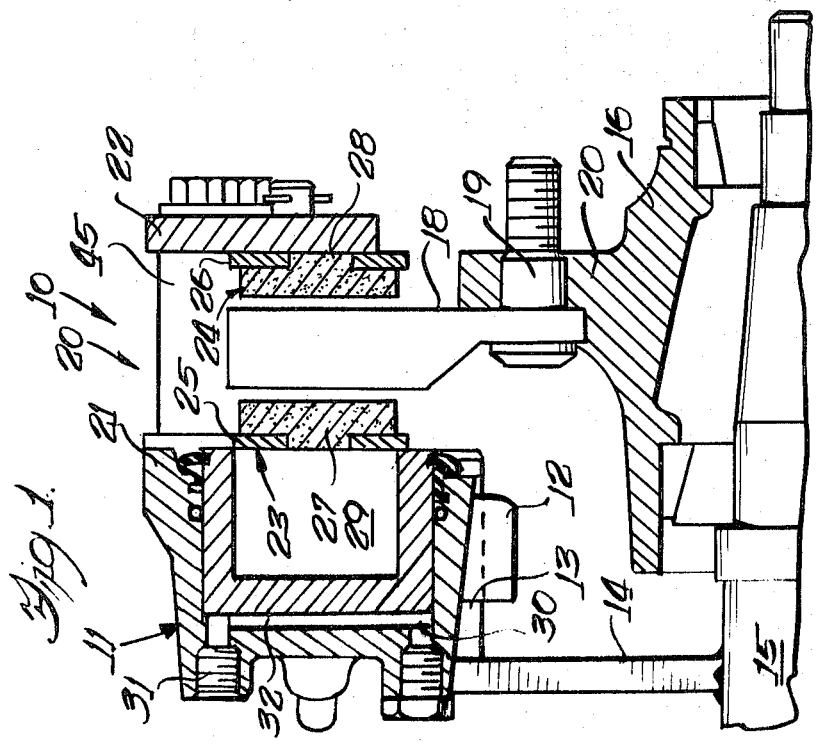

CALIPER DISK BRAKE HAVING EASILY REMOVABLE LININGS

BACKGROUND OF THE INVENTION

The present invention relates generally to disk brakes and more particularly to disk brakes wherein worn parts can be easily discovered and quickly replaced.

It is a general object of the invention to provide a disk brake wherein the brake linings can be changed efficiently, quickly and simply. A related object is to provide such a brake wherein the lining change can be accomplished without removing the adjacent wheel or disassembling the brake housing.

It is another object of the invention to provide a disk brake assembly wherein the condition of the linings can be easily checked by feel or by visual inspection.

It is a further object to provide a disk brake assembly having increased susceptibility to cooling by the passage of air over brake parts.

It is yet another object to provide a disk brake assembly having parts which can be inexpensively and easily made. A related object is to provide a disk brake in which spacer parts used in a housing caliper can be easily, quickly and inexpensively altered for use with any of a great number of brake disk and lining combinations.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is a sectional view showing a typical disk brake embodying the present invention;

FIG. 2 is a plan view showing the disk brake of FIG. 1 as it appears when viewed from a position located radially outwardly of the brake disk; and FIG. 3 is an elevational view of the brake mechanism shown in FIGS. 1 and 2 and partially broken away to show in further detail various brake parts.

DETAILED DESCRIPTION

While the invention will be described in connection with a preferred embodiment, it is understood that it is not intended to limit the invention to that embodiment. On the contrary, it is intended to cover all alternatives, modifications and equivalents as may be included within the spirit and scope of the invention.

Turning first to FIG. 1, there is shown a typical disk brake assembly 10 embodying the present invention. This particular brake assembly 10 includes a housing 11 which is mounted, by a collar 12, for sliding motion upon a fixed foot 13. The foot 13 is supported by a bracket 14 which, in turn, is secured by weldments or other means upon a relatively fixed shaft 15. It will be understood that the present invention also contemplates the use of a relatively fixed disk brake housing 11 and a relatively rotatable shaft 15.

Mounted for rotation about the fixed shaft 15 is a wheel 16, which carries with it a brake disk 18. In the illustrated embodiment, this disk takes the form of an annular member mounted, as by bolts 19, to a wheel flange 20, but it will be understood that the disk 18 can be attached by splines or other appropriate means to the wheel 16.

For braking the rotation of the disk 18, the housing 11 can be considered to comprise a brake caliper 20 including a primary housing member 21 and a secondary plate member 22 disposed on opposite sides of the disk 18. Each housing member 21 and 22 has associated therewith a brake pad 23 and 24 which, in the illustrated embodiment, includes a backing plate 25 and 26 and a pad lining 27 and 28.

These brake pads 23 and 24 are moved into and out of braking engagement with the disk 18 by means of a brake piston 29 which may be actuated by any convenient means, such as the introduction of hydraulic fluid through an inlet port 30. To permit the removal of air, impurities, and/or to exhaust fluid, a bleeder port 31 is also provided.

Introduction of pressurized brake fluid into a chamber 32 causes motion of the piston 29 and the associated first brake pad assembly 23 toward and into engagement with the disk 18. Pressurization of the chamber 32 also causes the housing 11 and the rigidly attached secondary plate 22 and associated brake pad assembly 24 to be drawn to the left toward the axially fixed disk 18 as illustrated in FIG. 1. Thus the rotatable disk 18 is frictionally engaged on both its sides and braking action occurs.

In accordance with the invention, the disk-engaging brake pads 23 and 24 may be easily and quickly removed and replaced. This is accomplished by mounting the pads 23 and 24 upon removable pins 33 and 34 which are in turn carried by the primary and secondary housing members 21 and 22. As illustrated, especially in FIG. 3, two pins 33 and 34 are disposed outside the periphery of the brake disc 18, and engage open-sided recesses 36 and 37 formed in opposed relation in the periphery of the pad 24. To secure the pins 33 and 34 in their desired locations in holes formed in the housing members 21 and 22, each pin may be formed with an enlarged head 39 and 40; the opposite end of the pin can be secured in the illustrated locations by any convenient means such as cotter pins 42 and 43. In the illustrated embodiment, these pins 33 and 34 extend between the primary and secondary housing members 21 and 22 and the first and second brake pads 23 and 24 and across the plane of the disk 18.

Brake pads so mounted are easily removed and replaced without disturbing housing 11, the wheel 16 or the brake disk 18. After withdrawal of one pin 39 or 40, the pads 23 and 24 can be simply rotated sufficiently to clear other brake parts, and then slipped off the opposite still-installed pin 40 or 39 and out of the brake. The removed pad can be reinstalled or a replacement pad installed by simply reversing this process.

The pad linings of this novel brake may be easily visually inspected while still in place. Moreover, dirt or other foreign matter is readily expelled from the brake, and the pads and disk are rendered accessible to cooling air. In accordance with this aspect of the invention, spacer members 45 and 46 of a pre-determined length are carried in the caliper 20 and are rigidly mounted by bolts 48-51 between the primary and secondary housing members 21 and 22. Since a plurality of spacers 45 and 46 are located around the periphery of the disk 18 in spaced apart relation, the spacers 45 and 46 and housing members 21 and 22 define a hole 53 through which foreign matter can be expelled from the brake, and through which the condition of the brake pad linings 27 and 28 can be inspected, either visually or by touch. It is a feature of the invention that great versatility in the use of these spacers 45 and 46 is obtained by forming the spacers 45 and 46 so that their length X can be easily shortened by grinding or any other simple machining operation, thereby correspondingly changing the distance between the primary and secondary housing members 21 and 22. Thus, a single set of spacers, when suitably modified in length, can be used with a wide variety of pad and disk combinations.

The invention is claimed as follows:

1. A disk brake for braking the rotation of a disk means, comprising a primary housing slidably mounted on a fixed foot at one side of the disk means, a brake piston disposed in a fluid powder chamber in the primary housing, a secondary plate disposed at an opposite disk means side, spacers of uniform cross-section interposed between the primary housing and secondary plate around the periphery of the disk means in spaced apart relation, the spacers being separable from the primary housing and from the secondary plate, bolts centered on a bolt circle of given radius extending at least partly through the primary housing, completely through the spacer means and at least partly through the secondary plate to join the primary housing, the spacer means and the secondary plate in a rigid unit, the separable spacers having a length sufficient to space apart the primary housing and the secondary plate sufficiently to accommodate therebetween any combination of brake pads having a predetermined total thickness and a disk means of predetermined thickness the fluid power chamber being oriented to actively force the piston toward one disk means side and reactively force the primary housing away from the disk to draw the rigidly connected secondary plate toward the opposite disk side, a plurality of unthreaded cylindrical pins of smooth circular cross-sectional shape extending across the disk means between the primary housing and secondary plate and mounted in holes of circular cross-section for quick sliding withdrawal therefrom at positions radially outside the disk means periphery but substantially on the bolt circle and circumferentially outside the spacers and bolts, a first brake pad interposed between the primary housing piston and one side of the disk means, a second brake pad interposed between the secondary housing and the opposite side of the disk means, both brake pads being provided with ears extending radially outwardly of the bolt circle and defining arcuate, opposed open-sided recesses opening outwardly away from said pads and said spacers to permit removal of the brake pads from the brake when a single pin is withdrawn from the housing and the brake pads, non-ear body portions of the pads being located radially inwardly of the bolt circle for contact with the brake disk means.

2. A disk brake according to claim 1 wherein a hole is defined by said primary housing, said secondary plate and adjacent spacers, the defined hole being large enough to permit the expulsion of foreign matter from the brake and the visual or tactile inspection of the brake pads.

* * * * *